(12) United States Patent
Wang et al.

(10) Patent No.: US 12,476,989 B2
(45) Date of Patent: Nov. 18, 2025

(54) METHOD FOR TRAINING CREDIT THRESHOLD, METHOD FOR DETECTING IP ADDRESS, COMPUTER DEVICE AND STORAGE MEDIUM

(71) Applicant: BIGO TECHNOLOGY PTE. LTD., Singapore (SG)

(72) Inventors: Xiang Wang, Guangzhou (CN); Qinghua Zhong, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 322 days.

(21) Appl. No.: 18/041,275

(22) PCT Filed: Aug. 6, 2021

(86) PCT No.: PCT/CN2021/111096
§ 371 (c)(1),
(2) Date: Feb. 10, 2023

(87) PCT Pub. No.: WO2022/033396
PCT Pub. Date: Feb. 17, 2022

(65) Prior Publication Data
US 2023/0328087 A1     Oct. 12, 2023

(30) Foreign Application Priority Data
Aug. 13, 2020  (CN) .......................... 202010813912.6

(51) Int. Cl.
*H04L 9/40*          (2022.01)
(52) U.S. Cl.
CPC ...... *H04L 63/1425* (2013.01); *H04L 63/1441* (2013.01); *H04L 63/1466* (2013.01)
(58) Field of Classification Search
CPC ............. H04L 63/1425; H04L 63/1441; H04L 63/1466; H04L 63/1416; G06F 18/214;
(Continued)

(56) References Cited
U.S. PATENT DOCUMENTS

| 10,158,657 B1 * | 12/2018 | Bray ...................... H04L 67/535 |
| 2011/0059727 A1 * | 3/2011 | Lisboa .................... H04L 51/04 |
| | | 455/414.1 |

(Continued)

FOREIGN PATENT DOCUMENTS

| CN | 105323210 A | 2/2016 |
| CN | 107911396 A | 4/2018 |

(Continued)

OTHER PUBLICATIONS

Extended European Search Report Communication Pursuant to Rule 62 EPC for European Application No. 21855449.1 dated Jun. 18, 2024, which is a foreign counterpart application to this application.

(Continued)

*Primary Examiner* — Maung T Lwin
*Assistant Examiner* — Mudasiru K Olaegbe
(74) *Attorney, Agent, or Firm* — Kolitch Romano Dascenzo Gates LLC

(57) ABSTRACT

Provided is a method for training credit thresholds, including: acquiring a plurality of service features from history data of a service operation triggered based on a plurality of IP addresses; hierarchically calculating at least two correlation coefficients for each of the service features; generating, for each of the IP addresses based on the correlation coefficients corresponding to the service features, a credit value indicating the validity of each of the IP addresses; generating an evaluation indicator for the plurality of IP addresses; and determining a credit value corresponding to the evaluation indicator as a credit threshold in response to the evaluation indicator meeting a target condition.

19 Claims, 3 Drawing Sheets

(58) Field of Classification Search
CPC ........ G06F 18/24; G06N 20/00; G06N 3/045; G06N 3/08
See application file for complete search history.

(56) References Cited

U.S. PATENT DOCUMENTS

| | | | | |
|---|---|---|---|---|
| 2014/0324522 | A1* | 10/2014 | Wilkins | G06Q 30/0201 705/7.29 |
| 2016/0080398 | A1 | 3/2016 | Yablokov | |
| 2019/0158526 | A1 | 5/2019 | Coskun | |
| 2019/0236695 | A1* | 8/2019 | McKenna | G06N 20/00 |
| 2019/0370073 | A1* | 12/2019 | Behar | G06F 3/0659 |
| 2020/0089848 | A1 | 3/2020 | Abdelaziz et al. | |
| 2020/0357055 | A1* | 11/2020 | Zhao | G06Q 20/202 |

FOREIGN PATENT DOCUMENTS

| | | |
|---|---|---|
| CN | 108667828 A | 10/2018 |
| CN | 110349038 A | 10/2019 |
| CN | 111049822 A | 4/2020 |
| CN | 111080397 A | 4/2020 |
| CN | 112003846 A | 11/2020 |
| WO | 2019178753 A1 | 9/2019 |

OTHER PUBLICATIONS

International Search Report of the International Searching Authority for State Intellectual Property Office of the People's Republic of China in PCT application No. PCT/CN2021/111096 issued on Nov. 5, 2021, which is an International application to which this application claims priority.

The State Intellectual Property Office of People's Republic of China, First Office Action in Patent Application No. CN202010813912.6 issued on Jun. 13, 2022, which is a foreign counterpart application corresponding to this U.S. Patent Application, to which this application claims priority.

China National Intellectual Property Administration, Notification to Grant Patent Right for Invention of Chinese application No. 202010813912.6 issued on Dec. 28, 2022, which is foreign counterpart application of this US application.

* cited by examiner

METHOD FOR TRAINING CREDIT THRESHOLD, METHOD FOR DETECTING IP ADDRESS, COMPUTER DEVICE AND STORAGE MEDIUM

CROSS-REFERENCE TO RELATED APPLICATION

This application is a U.S. national phase application of international application No. PCT/CN2021/111096, filed on Aug. 6, 2021, which claims priority to Chinese Patent Application No. 2020108139126, filed on Aug. 13, 2020, the disclosures of which are incorporated herein by reference in their entireties.

TECHNICAL FIELD

The present application relates to the technical field of operation monitoring, and in particular, to a method for training credit thresholds, and a method for detecting Internet Protocol (IP) addresses.

BACKGROUND OF THE INVENTION

When a user performs a behavior such as registration or login, a website usually sends a verification code by short message, email, or the like, such that the user can register and log in by entering the verification code.

Identity verification through information, such as a short message or an email, carrying a verification code has been widely used due to advantages such as simple operations, high security and timeliness. However, due to convenience and few restrictions, this verification manner can be easily utilized by illegal users for message bombardment. In particular, maliciously requesting short messages generates a lot of fees, resulting in huge losses to enterprises or individuals.

SUMMARY OF THE INVENTION

The present application provides a method for training credit thresholds and a method for detecting IP addresses.

According to some embodiments of the present disclosure, a method for training credit thresholds is provided. The method includes:
  acquiring a plurality of service features from history data of a service operation triggered based on a plurality of IP addresses;
  hierarchically calculating at least two correlation coefficients for each of the service features, wherein the correlation coefficient indicates a correlation between the service feature and validity of each of the IP addresses;
  generating, for each of the IP addresses based on the correlation coefficients corresponding to the service features, a credit value indicating the validity of each of the IP addresses;
  generating an evaluation indicator for the plurality of IP addresses, wherein the evaluation indicator is configured to evaluate the validity of the plurality of IP addresses that is predicted by using the service features of the plurality of IP addresses; and
  determining a credit value corresponding to the evaluation indicator as a credit threshold in response to the evaluation indicator meeting a target condition, wherein the credit threshold is configured to determine a validity status of the IP addresses.

According to some embodiments of the present disclosure, a method for detecting IP addresses is provided. The method includes:
  acquiring a plurality of service features from real-time data of a service operation triggered based on an IP address;
  querying a correlation coefficient corresponding to each of the service features, wherein the correlation coefficient indicates a correlation between the service feature and validity of the IP address;
  generating, based on the correlation coefficient corresponding to each of the service features, a credit value indicating the validity of the IP address; and
  determining the validity of the IP address by comparing the credit value with a preset credit threshold, such that the validity of the IP address is predicted by using the service features of the IP address.

According to some embodiments of the present disclosure, a computer device is provided, the computer device includes:
  at least one processor; and
  a memory configured to store at least one program; wherein
  the at least one processer, when loading and running the at least one program, is caused to perform the foregoing method for training the credit thresholds or the foregoing method for detecting the IP addresses.

According to some embodiments of the present disclosure, a non-volatile computer-readable storage medium is provided. The computer-readable storage medium stores a computer program. The computer program, when loaded and run by a processor, causes the processor to perform the foregoing method for training the credit thresholds or the foregoing method for detecting the IP addresses.

DETAILED DESCRIPTION

Figure 1:
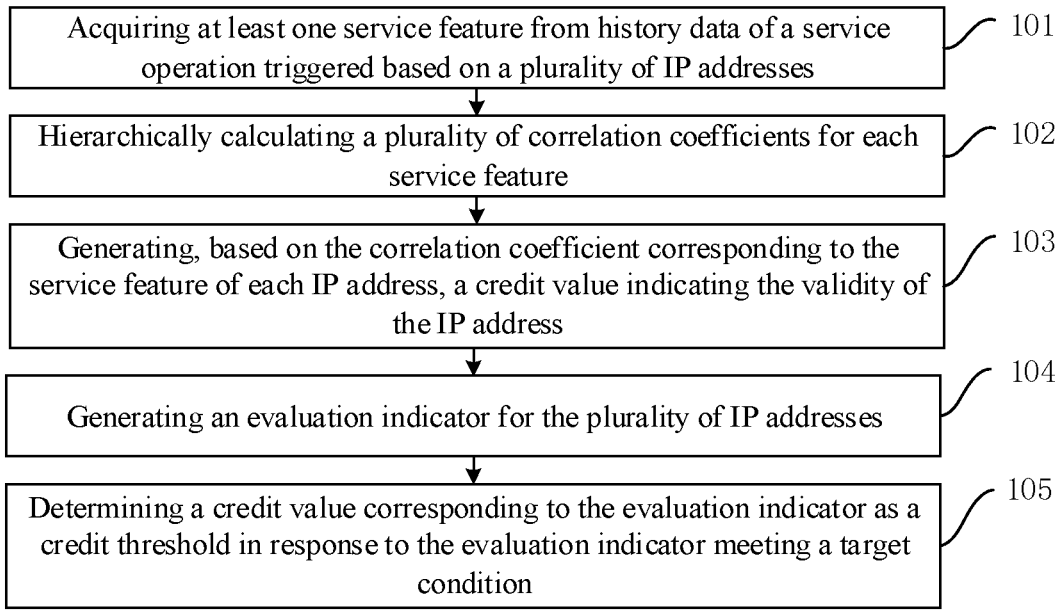
FIG. 1 is a flowchart of a method for training credit thresholds according to Embodiment 1 of the present application.

The following describes the present application with reference to the accompanying drawings and embodiments.

Some websites monitor the user's behaviors, such as registration and login, during daily operations to distinguish normal behaviors and abnormal behaviors. The websites usually monitor an IP address of the user in the following two manners:

1. Interception Based on Frequency

In the case that a quantity of requests from the IP address within a period of time reaches a threshold, the behavior is considered an abnormal behavior.

However, in this monitoring manner, on one hand, for the IP addresses that originally have a large quantity of requests, the normal behavior is mistakenly intercepted because the quantity of requests reaches the threshold. On the other hand, an illegal user may obtain a large quantity of IP addresses through an IP agent. After determining that a threshold exists, the illegal user can easily obtain the threshold and make requests from the large quantity of IP addresses to reduce a request frequency of each IP address, thereby evading control.

2. Interception Based on Low Verification Rate

In the case that a verification rate of the IP address within a period of time is lower than a threshold, the behavior is considered an abnormal behavior.

However, there are a large quantity of code receiving platforms used to automatically receive and send verification codes for verification. The illegal users may have a high verification rate by verifying through the code receiving platforms, thereby evading control.

In practical application, exceptions of IP addresses vary with service operations in different service fields. Short messages are used as an example. The exceptions of the IP addresses may include the following:

1. Request Short Messages to Attack a Phone Number

With a phone number as an attack object, an attacker cyclically calls interfaces used for registration, login, or other actions in different websites to frequently send short messages carrying verification codes to the phone number, to achieve the goal of attacking the phone number.

2. Request Short Messages Aimed to Increase Fees of a Website

With a website as an attack object, an attacker continuously changes various interface parameters, such as phone numbers and IP addresses, and cyclically calls interfaces used for registration, login, or other actions in the website to frequently send short messages carrying verification codes to different phone numbers. This greatly increases fees for sending the short messages paid by the website to achieve the goal of attacking the website.

3. Request Short Messages to Make Profits

When activities for purposes of registering new users, promoting products, and the like is carried out in a website, an attacker continuously changes various interface parameters, such as phone numbers and IP addresses, and cyclically calls interfaces used for registration, login, or other actions in the website to frequently send short messages carrying verification codes to different phone numbers. In this way, properties such as electronic coupons and physical gifts rewarded for new registering users are obtained, or a large quantity of products are purchased at low prices, or the like to achieve the goal of making profits.

For websites, it is inefficient to determine an IP address as an abnormal IP address or a normal IP address based on a relationship between some behavior data (such as a frequency and a verification rate) and a threshold.

Short messages are used as an example. Effects of different behavior data on determining whether an IP address is abnormal are described with reference to the following behavior data of requesting short messages from the IP address.

Tables 1 to 3 all record: the IP address, a quantity of requests for short messages from the IP address (quantity of requests for short messages), a quantity of authentications of verification codes in the short messages (quantity of verification), a success rate of authentications of verification codes (success rate of verification), a quantity of logged-in accounts at the IP address (quantity of accounts), a total quantity of phone numbers receiving the verification codes (total quantity of phone numbers), and a quantity of phone numbers receiving the verification codes across countries or regions (quantity of phone numbers across countries or regions).

In each table, the first three rows are history behavior data earlier than a previous day, and the fourth row is behavior data of the previous day.

TABLE 1

| | First case | | | | | |
|---|---|---|---|---|---|---|
| IP address | Quantity of requests for short messages | Quantity of verification | Success rate of verification | Quantity of accounts | Total quantity of phone numbers | Quantity of phone numbers across countries or regions |
| 1.1.1.1 | 100 | 50 | 0.5 | 100 | 100 | 0 |
| 1.1.1.1 | 200 | 100 | 0.5 | 200 | 200 | 0 |
| 1.1.1.1 | 300 | 150 | 0.5 | 300 | 300 | 0 |
| 1.1.1.1 | 400 | 200 | 0.5 | 400 | 400 | 0 |

In the first case, the quantity of requests for the short messages from the IP address continuously increases. In the case that monitoring is performed based on a threshold of the quantity of requests for the short messages and the threshold is low, the IP address may be mistaken intercepted. However, from other dimensions, the success rate of verification and the quantity of phone numbers across countries or regions do not change. The quantity of requests for the short messages from the IP address increases due to an increase of the quantity of phone numbers, which brings growth to service and is a normal behavior.

TABLE 2

| | | | Second case | | | |
|---|---|---|---|---|---|---|
| IP address | Quantity of requests for short messages | Quantity of verification | Success rate of verification | Quantity of accounts | Total quantity of phone numbers | Quantity of phone numbers across countries or regions |
| 1.1.1.1 | 100 | 50 | 0.5 | 100 | 100 | 0 |
| 1.1.1.1 | 200 | 100 | 0.5 | 200 | 200 | 0 |
| 1.1.1.1 | 200 | 150 | 0.5 | 300 | 300 | 0 |
| 1.1.1.1 | 400 | 40 | 0.1 | 400 | 400 | 0 |

In the second case, the quantity of requests for the short messages from the IP address continuously increases. With reference to other dimensions, the success rate of verification and the quantity of accounts greatly change. The quantity of requests for the short messages from the IP address increases, but the quantity verifying the verification does not increase. A large quantity of invalid requests increased suddenly from the IP address may be that the IP address is attacking the website from. In the case that monitoring is performed based on a threshold of the quantity of requests for the short messages and the threshold is high, the IP address may be omitted.

TABLE 3

| | | | Third case | | | |
|---|---|---|---|---|---|---|
| IP address | Quantity of requests for short messages | Quantity of verification | Success rate of verification | Quantity of accounts | Total quantity of phone numbers | Quantity of phone numbers across countries or regions |
| 1.1.1.1 | 100 | 50 | 0.5 | 100 | 100 | 0 |
| 1.1.1.1 | 200 | 100 | 0.5 | 200 | 200 | 0 |
| 1.1.1.1 | 300 | 150 | 0.5 | 300 | 300 | 0 |
| 1.1.1.1 | 400 | 120 | 0.3 | 400 | 400 | 400 |

In the third case, the quantity of requests for the short messages from the IP address continuously increases. With reference to other dimensions, the success rate of verification and the quantity of phone numbers across countries or regions greatly change. That is, in response to a large quantity of requests, the success rate of verification decreases, and a large quantity of requests from phone numbers cross-country or region increases suddenly. The website may be attacked by the IP address using an agent. In the case that monitoring is performed based on a threshold of the quantity of requests for the short messages and the threshold is high, the IP address may be omitted.

Embodiment 1

FIG. 1 is a flowchart of a credit threshold training method according to Embodiment 1 of the present application. The embodiment is applicable to constructing an effective credit scoring mechanism by obtaining impact of different features on anomaly detection through history data learning. The method may be performed by an apparatus for training credit thresholds. The apparatus for training credit thresholds may be implemented by software and/or hardware and may be configured in a computer device, such as a server, a workstation, or a personal computer (PC). The method includes the following steps.

In 101, a plurality of service features are acquired from history data of a service operation triggered based on a plurality of IP addresses.

In the embodiment, a client requests a server for services such as registration, login, password recall, or payment, to trigger corresponding service operations, such as sending a short message containing a verification code to a specified phone number or sending an email containing a verification link to a specified email address. The client performs verification by using information such as the verification code or the verification link.

The server records an IP address of each of the clients, and records data generated by each of the clients in the case that a service operation is performed as history data.

A computer device acquires the history data, and marks positive and negative samples based on validity of each IP address. The positive samples are abnormal IP addresses, and the negative samples are normal IP addresses.

In order to ensure a training effect, history data of the abnormal IP addresses is usually all related to abnormal behaviors. History data of the normal IP addresses is not used for training to avoid interference.

Preprocessing such as data cleansing, missing value processing, and outlier processing may be performed on the history data to convert the history data into formatted data that can be used for training.

Data cleansing may be performed to clean junk samples, such as fake IP addresses that use simulators or virtual private network (VPN) proxies.

In the case that the client tracks reported data, a small quantity of empty IP addresses may exist. Missing value processing may be performed to search for and filter out history data of the empty IP addresses. The history data of the empty IP addresses is not used for training.

Outlier processing may be performed to find and filter out abnormal IP addresses such as fake IP addresses that use simulators or VPN proxies, and the history data is not used for training.

In addition, in order to ensure the training effect, a ratio of the sample size of the positive samples to the sample size of the negative samples is within a preset range. A difference between the sample size of the positive samples and the sample size of the negative samples cannot be large. Therefore, a ratio balance can be achieved by downsampling the negative samples.

For the history data of the service operation, the IP addresses may be used as a statistical dimension. The plurality of service features are acquired from the history data of the service operation.

Because the service features have many dimensions, and some of the service features have no correlation with the validity, using invalid service features increases complexity and has no improvement effect. Therefore, a correlation between each of the service features and the validity can be learned through a machine learning algorithm or statistical feature analysis such as Pearson statistical learning to acquire valid service features and filter out the invalid service features.

For different service operations, because the correlation between the service feature and the validity is different, the selected service feature is also different. Selection of the service feature is not limited in the embodiment.

In an embodiment, it is determined that the service operation triggered based on the plurality of IP addresses is a registration operation. The registration operation includes sending a short message containing a verification code and verifying the verification code.

In the embodiment, a plurality of the following data is acquired from the history data of the registration operation as service features:

a quantity of requests for short messages from the IP address, a quantity of authentications of verification codes, a success rate of authentications of verification codes, a quantity of logged-in accounts at the IP address, a total quantity of phone numbers receiving the verification codes, and a quantity of phone numbers receiving the verification codes across countries or regions.

The client may verify a same verification code for a plurality of times in one verification operation. The quantity of authentications of verification codes may be a quantity of cumulative verification times.

The foregoing service features are merely an example. When the embodiments of the present application are implemented, other service features may be set based on an actual service operation. A type of service feature is not limited in the embodiments of the present application.

In 102, at least two correlation coefficients are hierarchically calculated for each of the service features.

Different service features have different degrees of importance for describing the validity of the IP address. For example, for the registration operation, the success rate of authentications of verification codes, the quantity of phone numbers receiving the verification codes across countries or regions, and the like are strongly correlated service features, that is, they have large impact on the validity. The quantity of requests for the short messages and the quantity of logged-in accounts at the IP address are weakly correlated service features, that is, they have small impact on the validity.

In implementation, when the service features correspond to different values (namely, levels), it is possible to adaptively learn the correlation coefficient when the service feature corresponds to each value. The correlation coefficient is configured to indicate the correlation between the service feature and the validity of the IP address.

In an embodiment of the present application, the correlation coefficient may be calculated through a weight of evidence (WOE), an algorithm for transforming continuous variables into discrete variables. The WOE may be used to characterize the impact of different service features on the validity. In the embodiment, step 102 may include the following steps.

In 1021, a plurality of feature ranges are set for each of the service features.

In the embodiment, the service feature is a continuous variable. A value range of the service feature is divided into a plurality of continuous feature ranges, such that the service feature is converted into a discrete variable.

In 1022, the plurality of IP addresses are divided, based on values of the service feature, into feature subsets corresponding to the feature ranges.

The value of the service feature of an IP address may be compared with the corresponding feature ranges one by one. In the case that the value of the service feature is within a feature range, the IP address may be organized into a feature subset corresponding to the feature range.

In 1023, a WOE of each of the feature ranges is calculated according to the IP addresses in the feature subset corresponding to the feature range, and determined as the correlation coefficient of the service feature in the feature range.

In the embodiment, the WOE of each feature range may be calculated according to the IP addresses corresponding to the service feature in the feature subset corresponding to the feature range, and determined as the correlation coefficient of the service feature in the feature range.

In implementation, the IP address is marked with a first status representing the validity of the IP address. The first status is a real status of the IP address, including normal and abnormal.

For a feature range corresponding to a service feature, a ratio of a quantity of IP addresses whose first statuses are abnormal in a feature subset corresponding to the feature range in a quantity of all IP addresses whose first statuses are abnormal corresponding to the service feature is determined as a first ratio. A ratio of a quantity of IP addresses whose first statuses are normal in the feature subset corresponding to the feature range in a quantity of all IP addresses whose first statuses are normal corresponding to the service feature is determined as a second ratio. A logarithm of a ratio of the first ratio to the second ratio is calculated and determined as the WOE of the service feature in the feature range.

For a service feature, a WOE is expressed as follows:

$$WOE_i = \ln\frac{P_{y_i}}{P_{n_i}} = \ln\left(\frac{\frac{y_i}{y_a}}{\frac{n_i}{n_a}}\right)$$

$WOE_i$ represents a WOE corresponding to an $i^{th}$ feature range, $y_i$ represents a quantity of IP addresses whose first statuses are abnormal in a feature subset corresponding to the $i^{th}$, feature range, $y_a$ represents a quantity of all IP addresses whose first statuses are abnormal corresponding to the service feature, $P_{y_i}$ represents a first ratio, $n_i$ represents a quantity of IP addresses whose first statuses are normal in the feature subset corresponding to the $i^{th}$ feature range, $n_a$ represents a quantity of all IP addresses whose first statuses are normal corresponding to the service feature, $P_{n_i}$ represents a second ratio, and ln represents an logarithm with the natural number e as the base.

The registration operation is used as an example. A quantity of requests for short messages is determined as a service feature. The quantity of requests for short messages is a continuous variable. The continuous variable is discretized and divided into 6 feature ranges, and the WOE of each feature range is acquired as shown in following table 4.

TABLE 4

| Sequence number | Feature range | Quantity of abnormal IP addresses | Quantity of normal IP addresses | WOE |
|---|---|---|---|---|
| 1 | 0-10 | 5 | 200 | ln((5/120)/(200/1200)) |
| 2 | 10-50 | 10 | 200 | ln((10/120)/(200/1200)) |
| 3 | 50-100 | 15 | 200 | ln((15/120)/(200/1200)) |
| 4 | 100-300 | 20 | 200 | ln((20/120)/(200/1200)) |
| 5 | 300-500 | 30 | 200 | ln((30/120)/(200/1200)) |
| 6 | More than 500 | 40 | 200 | ln((40/120)/(200/1200)) |
| | Total | 120 | 1200 | |

A quantity of positive samples in the feature range is positively correlated with the WOE. It can be learned from table 4 that the more abnormal IP addresses in the feature subset corresponding to the feature range, the greater the WOE. Therefore, the WOE represents a correlation between the service feature and the validity.

The WOE describes a direction and magnitude of impact of the service feature on the validity within the feature range. In the case that the WOE is positive, the service feature has positive impact on judgment of an individual in the feature range. In the case that the WOE is negative, the service feature has negative impact on the judgment of the individual in the feature range. The magnitude of the WOE reflects the magnitude of the impact.

The above method for calculating the correlation coefficient is merely an example. When the embodiments of the present application are implemented, another method for calculating the correlation coefficient may be performed based on the actual service operation. For example, the correlation coefficient is calculated by using an information value (IV), which is configured to measure a prediction capability of an independent variable, a receiver operating characteristic (ROC) curve, or information entropy. This is not limited in the embodiments of the present application.

In 103, for each of the IP addresses, a credit value indicating the validity of each of the IP addresses is generated based on the correlation coefficients corresponding to the service features.

In implementation, each IP address is traversed. The service operation triggered from the IP address is analyzed based on the service features of the IP address. The impact of the service features of the IP address on the validity is quantified as the credit value based on the correlation coefficients for the impact of the service features of the IP address on the validity. The credit value reflects a credibility degree of the service operation triggered by the IP address on the validity.

In an embodiment of the present application, step 103 may include the following steps.

In 1031, for each of the service features of the IP address, the correlation coefficient associated with the feature range within which a value of each of the service features is queried.

In the embodiment, the plurality of feature ranges that are set for each service feature of the IP address may be queried. Each feature range is associated with a correlation coefficient.

The value of the service feature is compared with the plurality of feature ranges to determine the feature range within which the value of the service feature is. The correlation coefficient associated with the feature range is extracted.

In 1032, a feature weight trained for the service feature is searched.

In the embodiment, the feature weight may be pre-trained for each service feature. The feature weight may be configured to indicate importance of the service feature to the prediction of the validity of the IP address.

In an embodiment, the feature weight is a model parameter in a classification model. The classification model is configured to predict, based on the service features, a second status (including normal and abnormal) indicating the validity of the IP address, such that the feature weight trained for each service feature in the case that the classification model is trained can be searched.

In addition to using the model parameter in the classification model as the feature weight of the service feature, the feature weight of the service feature may be set in another manner. For example, operation and maintenance personnel directly set a feature weight for each of the service features. The manner of setting the feature weight of the service feature is not limited in the embodiment.

In 1033, a candidate value of each of the service features is calculated based on the correlation coefficient and the feature weight.

In the embodiment, the correlation coefficient and the feature weight may be used as variables to calculate the candidate value of each service feature, such that the candidate value is positively correlated with the correlation coefficient and the feature weight. That is, the greater the correlation coefficient, the greater the candidate value, and the smaller the correlation coefficient, the smaller the candidate value. Similarly, the greater the feature weight, the greater the candidate value, and the smaller the feature weight, the smaller the candidate value.

In an embodiment, a first product of the correlation coefficient and the feature weight is calculated. A first sum of the first product and a regression sub-intercept is calculated. The regression sub-intercept is a ratio of a regression intercept to a quantity of service features corresponding to the IP address. The regression intercept is configured to predict the validity of the IP address.

A second product of the first sum and a preset scale factor is calculated. A second sum of the second product and a sub-offset is calculated and determined as the candidate value. The sub-offset is a ratio of an offset to the quantity of service features corresponding to the IP address.

In the embodiment, the candidate value is expressed as follows:

$$\text{Score}_i = \left(woe_i * w_i + \frac{a}{n}\right) \text{factor} + \frac{\text{offset}}{n}$$

The IP address has n service features. $\text{Score}_i$ represents a candidate value of an $i^{th}$ service feature. $woe_i$ represents a correlation coefficient (such as WOE) of the $i^{th}$ service feature. $w_i$ represents a feature weight of the $i^{th}$ service feature. a represents the regression intercept.

$$\frac{a}{n}$$

represents the regression sub-intercept. factor represents the scale factor. offset represents the offset. factor is set based on a risk preference.

$$\frac{\text{offset}}{n}$$

offset represents the sub-offset.

The above manner of calculating the candidate value is merely an example. When the embodiments of the present application are implemented, other manners of calculating the candidate value is set based on the actual service operation, for example, linear fusion of the correlation coefficient and the feature weight. This is not limited in the embodiments of the present application.

In 1034, all candidate values are summed, and a sum is determined as the credit value indicating the validity of each of the IP addresses.

The sum of the candidate values of all service features of the IP address may be calculated as the credit value indicating the validity of the IP address.

In an embodiment, the credit value is expressed as follows:

$$\text{Score} = \sum_{i}^{n}\left(\left(woe_i * w_i + \frac{a}{n}\right)\text{factor} + \frac{\text{offset}}{n}\right)$$

In the embodiment, the credit value is calculated based on the correlation coefficient and the feature weight. Accuracy of the credit value can be improved by referring to the impact of the service features on the validity locally and the importance of the service features to the validity globally.

In 104, an evaluation indicator is generated for the plurality of IP addresses.

In the embodiment, the validity of the plurality of IP addresses is predicted by applying the service features of the plurality of IP addresses. The evaluation indicators are generated for the prediction. The evaluation indicators are configured to evaluate the validity of the IP address that is predicted by using the service features.

In an embodiment of the present application, step 104 may include the following steps.

In 1041, the service features corresponding to the IP address are input into a classification model. A second status indicating the validity of the IP address is predicted based on the classification model.

In the embodiment, the classification model is pre-trained. The classification model is a binary classification model, and is configured to predict, based on the service features of the IP address, the second status (including normal and abnormal) indicating the validity of the IP address.

The classification model includes a machine learning model such as a support vector machine (SVM), logistic regression (LR), or random forest (RF) model, or includes a deep learning model such as a convolutional neural network (CNN). A type of the classification model is not limited in the embodiment.

In order to reduce training complexity, the feature weight of the service feature is set in the model parameter of the classification model. The feature weight is configured to calculate the credit value. Therefore, a classification model with a simple structure (namely, a few model parameters) and requiring a small quantity of samples for training is selected. The feature weight of the service feature is trained together with the classification model.

LR is used as an example and is expressed as follows:

$$p = \frac{1}{1 + e^{-(w^T x + b)}}$$

$w^T$ represents the feature weight, x represents the service feature corresponding to the IP address, b represents the regression intercept, and p represents the second status indicating the validity of the IP address.

During training, the service features are input into the classification model to predict the second status indicating the validity of the IP address. A loss value LOSS between the first status and the second status is calculated by a preset loss function. The loss value LOSS reflects a degree of inconsistency between the first status and the second status, i.e., a degree to which an abnormal IP address is predicted as a normal IP address or a degree to which a normal IP address is predicted as an abnormal IP address.

In an embodiment, the loss function F(w) is expressed as follows:

$$F(w) = \sum_{n=1}^{N}(y_n\ln(p) + (1 - y_n)\ln(1 - p))$$

N represents a quantity of samples, n∈N, p represents the second status, i.e., a predicted value, $$p = \frac{1}{1 + e^{-w^T x}}$$

in the case that the LR model is trained based on the service features, and $y_n$ represents an $n^{th}$ first status, i.e., a real value.

In the case that a loss value is calculated in each iterative training, it is determined whether the loss value is less than or equal to a preset threshold.

In response to the loss value being less than or equal to the preset threshold, it is determined that the training of the classification model is completed, and a structure of the classification model and model parameters thereof may be stored.

In response to the loss value being greater than the preset threshold, the model parameters in the classification model are updated in a stochastic gradient manner or the like, and the service features are input into the classification model to predict the second status indicating the validity of the IP address to perform next iterative training.

In the case that the IP address is classified, the classification model is started and its model parameters is loaded. The service features of the IP address are input into the classification model for processing. The classification model outputs the second status indicating the validity of the IP address to predict that the IP address is a normal IP address or an abnormal IP address.

In one embodiment, the model parameters of the classification model include the feature weight set for each service feature. An optimal feature weight is found through a plurality of iterative training.

In another embodiment, the model parameters of the classification model such as the LR model further include the regression intercept. An optimal regression intercept is found through a plurality of iterative training.

Therefore, for the LR model, the feature weight and the regression intercept trained for each service feature is found. The feature weight and the regression intercept are loaded in the LR model. In the case that the loading is completed, the service features corresponding to the IP address are input into the LR model to predict the second status indicating the validity of the IP address.

For other classification models, other model parameters are loaded to predict the second status indicating the validity of the IP address. This is not limited in the embodiment.

In 1042, a plurality of credit value ranges are set.

In the embodiment, the plurality of credit value ranges are set based on an overall range of the credit values of the plurality of IP addresses sampled this time. For example, in the case that the overall range of the credit values of the plurality of IP addresses sampled this time is [3, 35], the plurality of credit value ranges are set to [3, 5], [3, 10], [3, 20], and [3, 35]. The plurality of credit value ranges are alternatively preset prior to the credit value of each IP address being calculated. The plurality of credit value ranges are configured to divide credit values of a plurality of IP addresses sampled at any time. For example, the plurality of credit value ranges are set to $(-\infty, 5]$, $(-\infty, 10]$, $(-\infty, 20]$, and $(-\infty, 40]$. The credit value 40 is a maximum credit value empirically determined.

A manner of setting the plurality of credit value ranges, a quantity of the plurality of credit value ranges, and upper and lower limits of each credit value range are not limited in the embodiment.

In 1043, the IP address is organized into an IP address subset corresponding to the credit value range within which the credit value of the IP address is.

The credit value of each of the IP addresses is compared with each of the plurality of credit value ranges. In response to the credit value being within one of the credit value ranges, the IP address is organized into the IP address subset corresponding to the credit value range.

The credit value of each of the plurality of IP addresses is compared and organized, that is, the plurality of IP addresses are organized into corresponding IP address subsets.

In 1044, an evaluation indicator corresponding to the IP address subset is calculated based on the first status and the second status of each of the IP addresses in the IP address subset.

In the embodiment, because a quantity of IP address subsets into which the plurality of IP addresses are divided is related to the credit value ranges that are set, and each of the IP addresses subset corresponds to one evaluation indicator, the quantity of evaluation indicators is related to the quantity of credit value ranges.

Each of the IP addresses is marked with the first status indicating the validity of the IP address. The first status of each IP address in each IP address subset is compared with the second status, such that an indicator for evaluating the prediction operation is generated for the IP addresses in each IP address subset based on a difference between the first status and the second status as the evaluation indicator.

In an embodiment, each evaluation indicator includes an accuracy rate and a recall rate. In the embodiment, a first value TP, a second value FN, and a third value TN are determined for each of the IP address subsets. The first value TP represents a quantity of IP addresses whose first status and second status are abnormal in the IP address subset. The second value FN represents a quantity of IP addresses whose first statuses are abnormal and whose second statuses are normal in the IP address subset. The third value TN represents a quantity of IP addresses whose first status and second status are normal in the IP address subset.

A ratio of a fourth value to a total quantity of IP addresses in the IP address subset is calculated as the accuracy rate. The fourth value is a sum of the first value TP and the third value TN. The accuracy rate acc is expressed as follows:

$$acc = \frac{TP + TN}{\text{total}}$$

A ratio of the first value TP to a fifth value is calculated as the recall rate. The fifth value is a sum of the first value TP and the second value FN. The recall rate rec is expressed as follows:

$$rec = \frac{TP}{TP + FN}$$

The above evaluation indicator is merely an example. In the case that the embodiments of the present application are implemented, other evaluation indicators, such as a precision rate or an F1 value, is set based on the actual service operation. This is not limited in the embodiments of the present application.

In the embodiment, in the case that some same parameters (such as the service features and regression intercept) are used to calculate the credit value of the IP address and the evaluation indicator, the same parameters are trained once. This can reduce costs of training the parameters and enhance a correlation between the credit value and the evaluation indicator, which is beneficial to subsequent application of the credit value as a credit threshold to determine a validity status.

In 105, in response to the evaluation indicator meeting a target condition, a credit value corresponding to the evaluation indicator is determined as the credit threshold.

In the embodiment, for the evaluation indicators of different IP address subsets, the evaluation indicator for evaluating the predicted validity of the IP address is taken as a reference to be compared with the preset target condition. In response to the evaluation indicator of an IP address subset meeting the target condition, an upper limit of the credit value range corresponding to the evaluation indicator is determined as the credit threshold. The credit threshold is configured to determine a validity status. In response to a credit value of an IP address being less than the credit threshold, the IP address is considered an abnormal IP address.

In response to the credit value of the IP address being greater than or equal to the credit threshold, the IP address is considered a normal IP address.

In an implementation, in the case that processing such as blocking is performed on an abnormal IP address, it is considered that a priority of the accuracy rate is higher than that of the recall rate. Accuracy rates of different IP address subsets can be compared to find a highest accuracy rate.

In response to the highest accuracy rate corresponding to one IP address subset, an upper limit of the credit value range that corresponds to the IP address subset corresponding to the highest accuracy rate is determined as the credit threshold.

In response to the highest accuracy rate corresponding to at least two IP address subsets, recall rates corresponding to the at least two IP address subsets are compared to find a highest recall rate, and an upper limit of the credit value range corresponding to the IP address subset having the highest recall rate is determined as the credit threshold.

In an experiment, 1000 positive samples (abnormal IP addresses whose first status is abnormal) and 2000 negative samples (normal IP addresses whose first status is normal) are acquired. The credit value and second status of each of the samples are calculated. The credit value of each of the samples is compared with 4 preset credit value ranges ((−∞, 5], (−∞, 10], (−∞, 20], and (−∞, 40]). In the case that the credit value of the sample is within one of the credit value ranges, the sample is organized into a sample subset corresponding to the credit value range. Table 5 shows results of dividing the 3000 samples into sample subsets corresponding to the 4 credit value ranges.

An accuracy rate and a recall rate corresponding to each credit value range are calculated based on the first status and the second status of each of the samples in the sample subset corresponding to the credit value range. The results are shown in table 5.

TABLE 5

| Credit value range | Quantity of samples in the sample subset | Accuracy rate | Recall rate |
| --- | --- | --- | --- |
| <40 | 700 | 0.62 | 0.97 |
| ≤20 | 1000 | 0.78 | 0.91 |
| ≤10 | 1100 | 0.90 | 0.86 |
| ≤5 | 200 | 1 | 0.81 |

It can be learned from table 5 that the lower an upper limit of the credit value range, the higher the accuracy rate and the lower the recall rate. The upper limit 5 is determined as the credit threshold, that is, the IP address whose credit value is lower than 5 is the abnormal IP address.

The above manner of setting the credit threshold is merely an example. In the case that the embodiments of the present application are implemented, other manners of setting the credit threshold are performed based on the actual service operation. For example, a credit value corresponding to a highest F1 value is set as the credit threshold. This is not limited in the embodiments of the present application.

In the embodiment, the plurality of service features are acquired from the history data of the service operation triggered based on the plurality of IP addresses. The at least two correlation coefficients are hierarchically calculated for each of the service features. The correlation coefficient indicates the correlation between the service feature and validity of each of the IP addresses. The credit value indicating the validity of the IP address is generated for each of the IP addresses based on the correlation coefficients corresponding to the service features. The evaluation indicator is generated for the plurality of IP addresses. The evaluation indicator is configured to evaluate the validity of the plurality of IP addresses that is predicted by using the service features of the plurality of IP addresses. The credit value corresponding to the evaluation indicator is determined as the credit threshold in response to the evaluation indicator meeting the target condition. The credit threshold is configured to determine a validity status of an IP address. The credit threshold is trained with assistance of the evaluation indicator, such that effectiveness of determining a validity status of an IP address by using the credit threshold is ensured. The credit value of the IP address is comprehensively evaluated based on the plurality of service features of the service operation to implement multi-dimensional comprehensive judgment and avoid using a threshold in a single dimension to determine the validity status. A risk of mistaken interception caused by a fault due to the single dimension can be reduced. A risk that illegal users bypass control by bypassing the threshold in the single dimension can also be reduced. That is, a risk of omission of abnormal IP address is reduced, and the overall security of website operation is improved.

Embodiment 2

Figure 2:
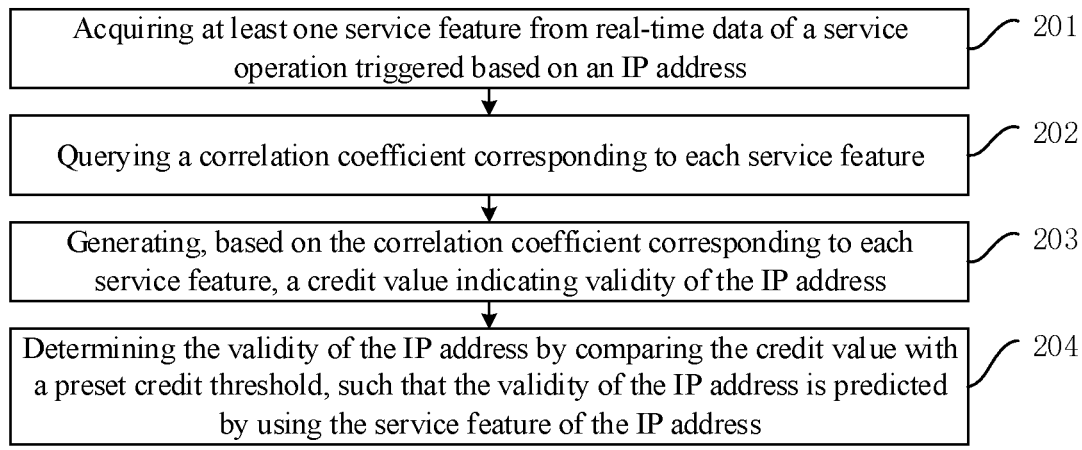
FIG. 2 is a flowchart of a method for detecting IP addresses according to Embodiment 2 of the present application.

FIG. 2 is a flowchart of an IP address detection method according to Embodiment 2 of the present application. This embodiment is applicable to detecting validity of an IP address through a credit score of the IP address. The method may be performed by an apparatus for detecting IP addresses. The apparatus for detecting IP addresses is implemented by software and/or hardware and may be configured in a computer device, such as a server, a workstation, or a PC. The method includes the following steps.

In 201, a plurality of service features are acquired from real-time data of a service operation triggered based on an IP address.

Figure 3:
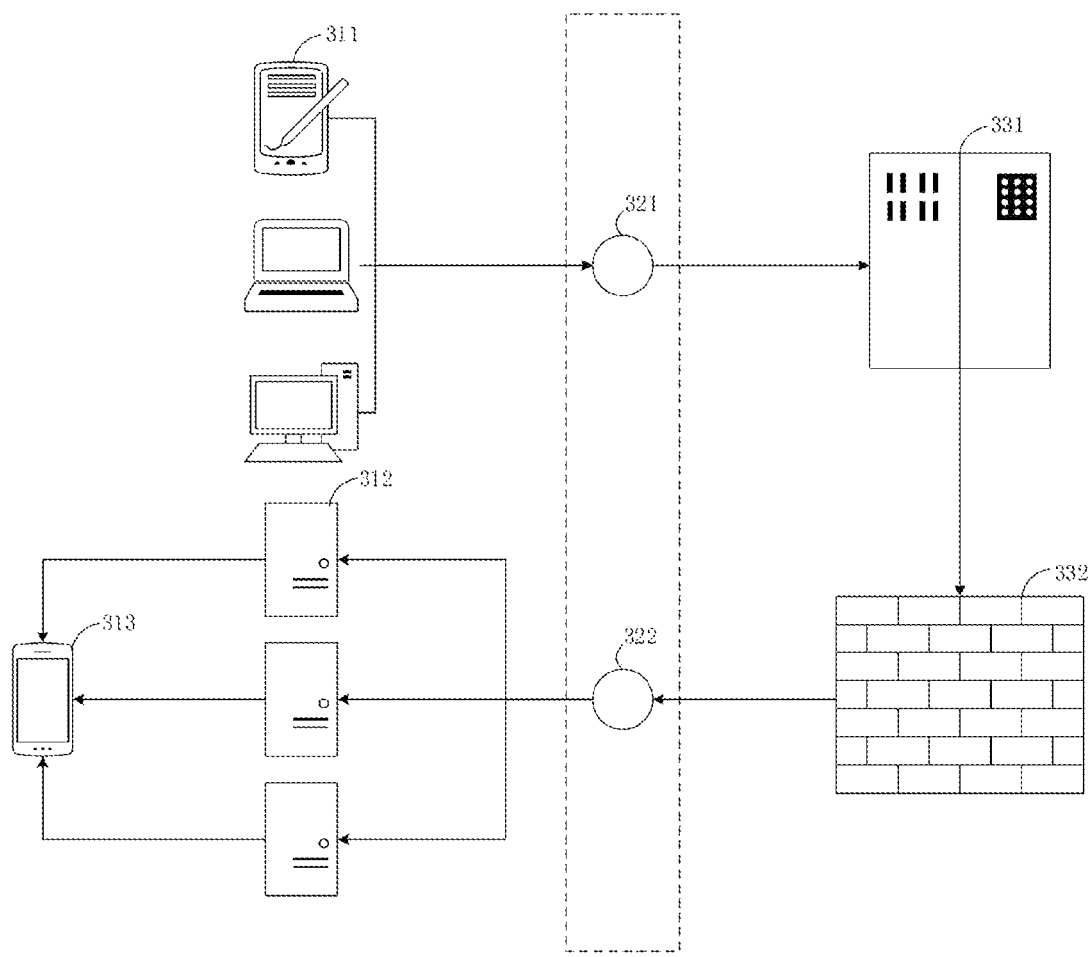
FIG. 3 is a schematic diagram of a service operation according to Embodiment 2 of the present application.

In the embodiment, as shown in FIG. 3, a client 311 may call a service operation interface 321 in real time to request a server 331 for a service such as registration, login, password recall, or payment, to trigger a corresponding service operation, such as sending a short message containing a verification code to a specified phone number or sending an email containing a verification link to a specified email address. The client performs verification by using information such as the verification code or the verification link.

The server 331 records an IP address of each client, and records data generated by each client when a service operation is performed as real-time data. In a firewall 332, the real-time data is acquired and validity is checked. Preprocessing such as data cleansing, missing value processing, and outlier processing is performed on the real-time data to convert the real-time data into formatted data that can be used for training. For the real-time data of the service operation, the IP address is a statistical dimension. The plurality of service features are acquired from the real-time data of the service operation. For different service operations, the correlation between the service feature and the validity is also different. Therefore, the selected service feature is also different, and selection of the service feature is not limited in the embodiment.

In an embodiment, it is determined that the service operation triggered based on the IP address is a registration operation. The registration operation includes sending a short message containing a verification code and verifying the verification code.

In the embodiment, the following service features are acquired from the real-time data of the registration operation:
  a quantity of requests for short messages from the IP address, a quantity of authentications of verification codes, a success rate of authentications of verification codes, a quantity of logged-in accounts at the IP address, a total quantity of phone numbers receiving the verification codes, and a quantity of phone numbers receiving the verification codes across countries or regions.

The above service features are merely an example. In the case that the embodiments of the present application are implemented, other service features are set based on an actual service operation. A type of service feature is not limited in the embodiments of the present application.

In 202, a correlation coefficient corresponding to each of the service features is queried.

The credit threshold training method provided in any embodiment of the present application is used to train the correlation coefficient for each service feature. The correlation coefficient indicates a correlation between the service feature and the validity of the IP address.

In an implementation, a plurality of feature ranges that are set for each service feature are queried. Each feature range is associated with a correlation coefficient.

A value of the service feature is compared with the plurality of feature ranges. In response to the value of the service feature being within one of the feature ranges, the correlation coefficient corresponding to the feature range is extracted.

In 203, a credit value indicating the validity of the IP address is generated based on the correlation coefficient corresponding to each of the service features.

The service features of the IP address are evaluated. Impact of the service features of the IP address on the validity is quantified as the credit value based on the correlation coefficients for the impact of the service features of the IP address on the validity.

In an embodiment of the present application, step 203 may include the following steps.

In 2031, a feature weight trained for the service feature is found.

In an example, the feature weight trained for each service feature when training a classification model is found. The classification model is used to predict, based on the service features, a second status indicating the validity of the IP address.

In 2032, a candidate value of the service feature is calculated based on the correlation coefficient and the feature weight.

The candidate value is positively correlated with the correlation coefficient and the feature weight. In an embodiment, a first product of the correlation coefficient and the feature weight is calculated. A first sum of the first product and a regression sub-intercept is calculated. The regression sub-intercept is a ratio of a regression intercept to a quantity of service features corresponding to the IP address. The regression intercept is configured to predict the validity of the IP address. A second product of the first sum and a preset scale factor is calculated. A second sum of the second product and a sub-offset is calculated and used as the candidate value. The sub-offset is a ratio of an offset to the quantity of service features corresponding to the IP address.

In 2033, all candidate values are summed, and a sum is determined as the credit value indicating the validity of the IP address.

In the embodiments of the present application, because the application of step 203 is basically similar to that of step 103, the description is relatively simple, and reference can be made to the description of step 103. Details are not described herein again.

In 204, the credit value is compared with a preset credit threshold to determine the validity of the IP address, such that the validity of the IP address is predicted by using the service features of the IP address.

The method for training credit thresholds provided in any embodiment of the present application is configured to train the credit threshold. In the case that the credit threshold is used to determine a validity status, when the validity of the IP address is predicted by using the service features, an evaluation indicator for this prediction is evaluated to meet a target condition.

In the embodiment, the credit value of the IP address is compared with the credit threshold to determine the validity of the IP address based on a comparison result. In response to the credit value being less than the preset credit threshold, it is determined the validity of the IP address as abnormal. In response to the validity of the IP address being determined as abnormal, the service operation from the IP address is prohibited. In response to the credit value being greater than or equal to the preset credit threshold, it is determined the validity of the IP address as normal. In response to the validity of the IP address being normal, the service operation from the IP address is allowed.

FIG. 3 shows an example of a registration operation. A communication interface 322 is called to request a telecommunications operator 312 to send a short message containing a verification code to a mobile communication terminal 313 on which a specified phone number is located. The client 311 is installed on the mobile communication terminal 313 or an electronic device other than the mobile communication terminal 313. An installation location of the client 311 is not limited in the embodiment.

In the embodiment, the plurality of service features are acquired from the real-time data of the service operation triggered based on the IP address. The correlation coefficient corresponding to each of the service features is queried. The correlation coefficient indicates the correlation between the service feature and validity of the IP address. The credit value indicating the validity of the IP address is generated based on the correlation coefficient corresponding to each of the service features. The credit value is compared with the preset credit threshold to determine the validity of the IP address, such that the validity of the IP address is predicted by using the service features of the IP address. The validity of the IP address is predicted by using the service features as a constraint condition, such that effectiveness of determining a validity status by using the credit threshold is ensured. The credit value of the IP address is comprehensively evaluated based on the plurality of service features of the service operation to implement multi-dimensional comprehensive judgment and avoid using a threshold in a single dimension to determine the validity status. A risk of mistaken interception caused by a fault due to the single dimension is reduced. A risk that invalid users bypass control by bypassing the threshold in the single dimension can also be reduced. That is, a risk of omission is reduced, and the overall security of website operation is improved.

For the method embodiments, they are described as a series of action combinations for simplicity of description, but the embodiments of the present application are not limited by the sequence of actions described, because some steps are performed in another sequences or simultaneously according to the embodiments of the present application. In addition, the related actions in the embodiments described in the specification are not necessarily necessary for the embodiments of the present application.

Embodiment 3

Figure 4:
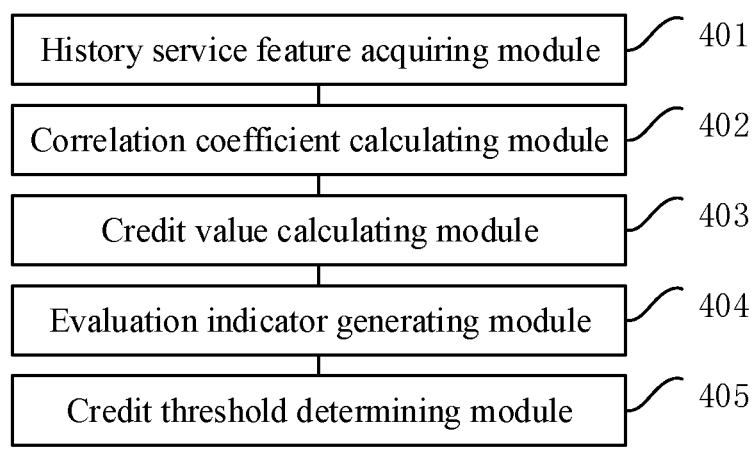
FIG. 4 is a schematic structural diagram of an apparatus for training credit thresholds according to Embodiment 3 of the present application.

FIG. 4 is a structural block diagram of an apparatus for training credit thresholds according to Embodiment 3 of the present application. The apparatus may include the following modules: a history service feature acquiring module 401 configured to acquire a plurality of service features from history data of a service operation triggered based on a plurality of IP addresses; a correlation coefficient calculating module 402, configured to hierarchically calculate at least two correlation coefficients for each of the service features, wherein the correlation coefficient indicates a correlation between the service feature and validity of each of the IP addresses; a credit value calculating module 403, configured to generate, for each of the IP addresses based on the correlation coefficients corresponding to the service features, a credit value indicating the validity of each of the IP addresses; an evaluation indicator generating module 404, configured to generate an evaluation indicator for the plurality of IP addresses, wherein the evaluation indicator is configured to evaluate the validity of the plurality of IP addresses that is predicted by using the service features of the plurality of IP addresses; and a credit threshold determining module 405, configured to determine a credit value corresponding to the evaluation indicator as a credit threshold in response to the evaluation indicator meeting a target condition, wherein the credit threshold is configured to determine a validity status of the IP addresses. The apparatus for training credit thresholds provided in the embodiments of the present application performs the method for training credit thresholds provided in any embodiment of the present application and has corresponding functional modules and effects for performing the method.

Embodiment 4

Figure 5:
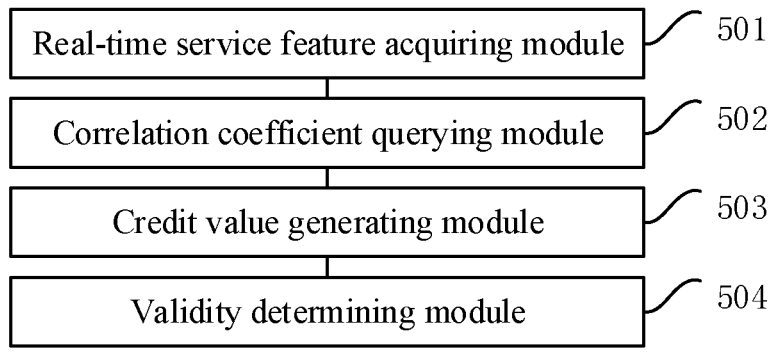
FIG. 5 is a schematic structural diagram of an apparatus for detecting IP addresses according to Embodiment 4 of the present application.

FIG. 5 is a structural block diagram of an apparatus for detecting IP addresses according to Embodiment 4 of the present application. The apparatus may include the following modules: a real-time service feature acquiring module 501, configured to acquire a plurality of service features from real-time data of a service operation triggered based on an IP address; a correlation coefficient querying module 502, configured to query a correlation coefficient corresponding to each of the service features, wherein the correlation coefficient indicates a correlation between the service feature and validity of the IP address; a credit value generating module 503, configured to generate, based on the correlation coefficient corresponding to each of the service features, a credit value indicating the validity of the IP address; and a validity determining module 504, configured to determine the validity of the IP address by comparing the credit value with a preset credit threshold, such that the validity of the IP address is predicted by using the service features of the IP address. The apparatus for detecting IP addresses provided in the embodiments of the present application performs the method for detecting IP addresses provided in any embodiment of the present application and has corresponding functional modules and effects for performing the method.

Embodiment 5

Figure 6:
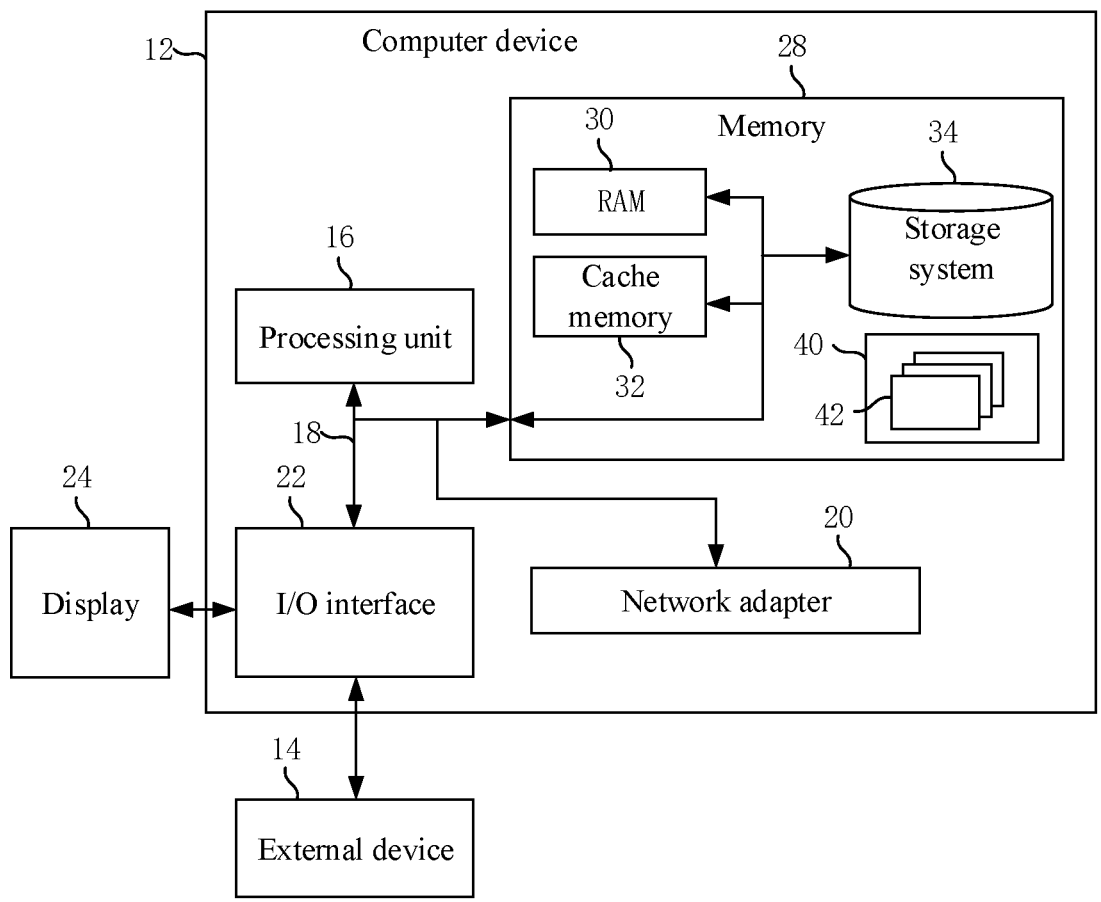
FIG. 6 is a schematic structural diagram of a computer device according to Embodiment 5 of the present application.

FIG. 6 is a schematic structural diagram of a computer device according to Embodiment 5 of the present application. FIG. 6 is a block diagram of an exemplary computer device 12 suitable for implementing the embodiments of the present application.

As shown in FIG. 6, the computer device 12 is in the form of a general-purpose computing device. Components of the computer device 12 include, but are not limited to: one or more processors or processing units 16, a system memory 28, and a bus 18 that couples various system components (including the system memory 28 and the processing units 16).

The system memory 28 includes a computer system-readable medium in the form of a volatile memory, such as a random access memory (RAM) 30 and/or a cache memory 32. A storage system 34 is a nonvolatile magnetic medium (not shown in FIG. 6 and commonly referred to as a hard disk drive) non-removable during read/write. A program/utility 40 having a set of (at least one) program modules 42, is stored, for example, in the memory 28. The computer device 12 further communicates with one or more external devices 14 (for example, a keyboard, a pointing device, and a display 24). Such communication is performed through an input/output (I/O) interface 22. The computer device 12 further communicates with one or more networks, for example, a local area network (LAN), a wide area network (WAN), and/or a public network such as the Internet, through a network adapter 20. As shown in the figure, the network adapter 20 communicates with other modules of the computer device 12 through the bus 18. The processing unit 16 runs programs stored in the system memory 28 to execute various functional applications and process data, for example, implement the method for training the credit thresholds and the method for detecting the IP addresses provided in the embodiments of the present application.

Embodiment 6

Embodiment 6 of the present application further provides a computer-readable storage medium. The computer-readable storage medium stores a computer program. The computer program, when loaded and run by a processor, causes the processor to perform a plurality of processes of the method for training the credit thresholds and the method for detecting the IP addresses. The same technical effect can be achieved. To avoid repetition, details are not described herein again.

What is claimed is:

1. A method for training credit thresholds to determine a validity status of an Internet Protocol (IP) address, comprising:
   acquiring a plurality of service features from history data of a service operation triggered based on a plurality of IP addresses;
   hierarchically calculating at least two correlation coefficients for each of the service features, wherein the correlation coefficient indicates a correlation between the service feature and validity of each of the IP addresses;
   generating, for each of the IP addresses, based on the correlation coefficients corresponding to the service features, a credit value indicating the validity of each of the IP addresses;
   generating an evaluation indicator for the plurality of IP addresses, wherein the evaluation indicator is configured to evaluate the validity of the plurality of IP addresses that is predicted by using the service features of the plurality of IP addresses; and
   determining a credit value corresponding to the evaluation indicator as a credit threshold in response to the evaluation indicator meeting a target condition, wherein the credit threshold is configured to determine a validity status of the IP address;
   wherein the IP address is marked with a first status indicating the validity of the IP address, a quantity of the evaluation indicator is at least one; and generating the evaluation indicator for each of the IP addresses comprises:
  inputting the service features corresponding to each of the IP addresses into a classification model and predicting, based on the classification model, a second status indicating the validity of the IP address;
  setting a plurality of credit value ranges;
  organizing the IP address into an IP address subset corresponding to the credit value range within which the credit value of the IP address is; and
  calculating an evaluation indicator corresponding to the IP address subset based on the first status and the second status of each of the IP addresses in the IP address subset.

2. The method according to claim 1, wherein acquiring the plurality of service features from the history data of the service operation triggered based on the plurality of IP addresses comprises:
  determining the service operation triggered based on the plurality of IP addresses as a registration operation, wherein the registration operation comprises sending a short message containing a verification code and verifying the verification code; and
  acquiring a plurality of following service features from the history data of the registration operation:
  a quantity of requests for short messages, a quantity of authentications of verification codes, a success rate of authentications of verification codes, a quantity of logged-in accounts, a total quantity of phone numbers receiving verification codes, and a quantity of phone numbers receiving verification codes across countries or regions.

3. The method according to claim 1, wherein the hierarchically calculating the at least two correlation coefficients for each of the service features comprises:
  setting a plurality of feature ranges for the service feature;
  dividing, based on values of the service features, the plurality of IP addresses into feature subsets corresponding to the feature ranges; and
  calculating a weight of evidence (WOE) of each of the feature ranges according to the IP addresses in the feature subset corresponding to the feature range, and determining the WOE as the correlation coefficient of the service feature in the feature range.

4. The method according to claim 3, wherein the IP address is marked with a first status indicating the validity of the IP address; and
  calculating the WOE of each of the feature ranges according to the IP addresses in the feature subset corresponding to the feature range comprises:
    determining a ratio of a quantity of IP addresses whose first statuses are abnormal in the feature subset to a quantity of all IP addresses whose first statuses are abnormal corresponding to the service feature as a first ratio;
    determining a ratio of a quantity of IP addresses whose first statuses are normal in the feature subset to a quantity of all IP addresses whose first statuses are normal corresponding to the service feature as a second ratio; and
    determining a logarithm of a ratio of the first ratio to the second ratio as the WOE of the service feature in the feature range.

5. The method according to claim 1, wherein the generating, for each of the IP addresses based on the correlation coefficients corresponding to the service features, the credit value indicating the validity of each of the IP addresses comprises:
  querying, for each of the service features of the IP address, the correlation coefficients associated with a feature range within which a value of each of the service features is;
  searching for a feature weight trained for the service feature;
  calculating a candidate value of each of the service features based on the correlation coefficient and the feature weight, wherein the candidate value is positively correlated with the correlation coefficient and the feature weight; and
  determining a sum of all the candidate values as the credit value indicating the validity of each of the IP addresses.

6. The method according to claim 5, wherein the searching for the feature weight trained for each of the service feature of the IP address comprises:
  searching for the feature weight trained for each of the service features of the IP address in response to training a classification model, wherein the classification model is configured to predict, based on the service features of the IP address, a second status indicating the validity of the IP address.

7. The method according to claim 5, wherein calculating the candidate value of each of the service features of the IP address based on the correlation coefficient and the feature weight corresponding to the service feature comprises:
  calculating a first product of the correlation coefficient and the feature weight;
  calculating a first sum of the first product and a regression sub-intercept, wherein the regression sub-intercept is a ratio of a regression intercept to a quantity of service features corresponding to the IP address, and the regression intercept is configured to predict the validity of the IP address;
  calculating a second product of the first sum and a preset scale factor; and
  calculating a second sum of the second product and a sub-offset and determining the second sum as the candidate value, wherein the sub-offset is a ratio of an offset to the quantity of service features corresponding to the IP address.

8. The method according to claim 1, wherein
  the classification model is a logistic regression (LR) model; and
  the inputting the service features corresponding to each of the IP addresses into the classification model and predicting, based on the classification model, the second status indicating the validity of the IP address comprises:
    searching for a feature weight and a regression intercept trained for each of the service features;
    loading the feature weight and the regression intercept in the LR model; and
    in response to the feature weight and the regression intercept being loaded in the LR model, inputting the service features corresponding to the IP address into the LR model and predicting, based on the LR model, the second status indicating the validity of the IP address.

9. The method according to claim 1, wherein each of the at least one evaluation indicator comprises an accuracy rate and a recall rate; and
  in the IP address subset corresponding to each of the credit value ranges, the calculating the evaluation indicator corresponding to the IP address subset based on the first status and the second status of each of the IP addresses in the IP address subset comprises:
   determining a first value TP, a second value FN, and a third value TN, wherein the first value TP represents a quantity of IP addresses whose first statuses and second statuses are abnormal in the IP address subset, the second value FN represents a quantity of IP addresses whose first statuses are abnormal and whose second statuses are normal in the IP address subset, and the third value TN represents a quantity of IP addresses whose first statuses and second statuses are normal in the IP address subset;
   calculating a ratio of a fourth value to a total quantity of IP addresses in the IP address subset as the accuracy rate, wherein the fourth value is a sum of the first value TP and the third value TN; and
   calculating a ratio of the first value TP to a fifth value as the recall rate, wherein the fifth value is a sum of the first value TP and the second value FN.

10. The method according to claim 9, wherein the determining the credit value corresponding to the evaluation indicator as the credit threshold in response to the evaluation indicator meeting the target condition comprises:
   comparing the accuracy rate of the at least one evaluation indicator; and
   in response to a highest accuracy rate corresponding to one IP address subset, determining an upper limit of the credit value range corresponding to the IP address subset as the credit threshold; or
   in response to the highest accuracy rate corresponding to at least two IP address subsets, comparing the recall rates corresponding to the at least two IP address subsets, and determining an upper limit of the credit value range corresponding to the IP address subset having a highest recall rate as the credit threshold.

11. The method according to claim 1, further comprising:
   inputting the service features corresponding to each of the IP addresses into the classification model and predicting, based on the classification model, the second status indicating the validity of the IP address;
   calculating a loss value between the first status and the second status of the IP address;
   determining whether the loss value is less than or equal to a preset threshold; and
   in response to the loss value being less than or equal to the preset threshold, determining that training of the classification model is completed; or
   in response to the loss value being greater than the preset threshold, updating a model parameter of the classification model, returning to the step of inputting the service features corresponding to the IP address into the classification model, and predicting, based on the classification model, the second status indicating the validity of the IP address, wherein the model parameter comprises at least one of a feature weight and a regression intercept that are set for each of the service features.

12. A method for detecting Internet Protocol (IP) addresses, comprising:
   acquiring a plurality of service features from real-time data of a service operation triggered based on an IP address;
   querying a correlation coefficient corresponding to each of the service features, wherein the correlation coefficient indicates a correlation between the service feature and validity of the IP address;
   generating, based on the correlation coefficient corresponding to each of the service features, a credit value indicating the validity of the IP address; and
   determining the validity of the IP address by comparing the credit value with a preset credit threshold, such that the validity of the IP address is predicted by using the service features of the IP address;
   wherein the preset credit threshold is trained by the method for training credit thresholds as defined in claim 1.

13. The method according to claim 12, wherein the querying the correlation coefficient corresponding to each of the service features comprises:
   querying a plurality of feature ranges that are set for the service feature; and
   in response to a value of the service feature being within one of the plurality of feature ranges, extracting the correlation coefficient corresponding to the feature range.

14. The method according to claim 12, wherein the determining the validity of the IP address by comparing the credit value with the preset credit threshold comprises:
   in response to the credit value being less than the preset credit threshold, determining the validity of the IP address as abnormal; or
   in response to the credit value being greater than or equal to the preset credit threshold, determining the validity of the IP address as normal.

15. The method according to claim 12, further comprising:
   in response to the validity of the IP address being determined as abnormal, prohibiting the service operation triggered based on the IP address.

16. A computer device, comprising:
   at least one processor; and
   a memory configured to store at least one program; wherein
   the at least one processor, when loading and running the at least one program, is caused to perform the method for detecting the Internet Protocol (IP) addresses as defined in claim 12.

17. A non-transitory computer-readable storage medium, storing a computer program, wherein the computer program, when loaded and run by a processor, causes the processor to perform the method for detecting the Internet Protocol (IP) addresses as defined in claim 12.

18. A non-transitory computer-readable storage medium, storing a computer program, wherein the computer program, when loaded and run by a processor, causes the processor to perform the method for training the credit thresholds as defined in claim 1.

19. A computer device, comprising:
   at least one processor; and
   a memory configured to store at least one program; wherein
   the at least one processor, when loading and running the at least one program, is caused to perform:
   acquiring a plurality of service features from history data of a service operation triggered based on a plurality of Internet Protocol (IP) addresses;
   hierarchically calculating at least two correlation coefficients for each of the service features, wherein the correlation coefficient indicates a correlation between the service feature and validity of each of the IP addresses;

generating, for each of the IP addresses based on the correlation coefficients corresponding to the service features, a credit value indicating the validity of each of the IP addresses;

generating an evaluation indicator for the plurality of IP addresses, wherein the evaluation indicator is configured to evaluate the validity of the plurality of IP addresses that is predicted by using the service features of the plurality of IP addresses; and determining a credit value corresponding to the evaluation indicator as a credit threshold in response to the evaluation indicator meeting a target condition, wherein the credit threshold is configured to determine a validity status of the IP address;

wherein the IP address is marked with a first status indicating the validity of the IP address, a quantity of the evaluation indicator is at least one; and generating the evaluation indicator for each of the IP addresses comprises:

inputting the service features corresponding to each of the IP addresses into a classification model and predicting, based on the classification model, a second status indicating the validity of the IP address;

setting a plurality of credit value ranges;

organizing the IP address into an IP address subset corresponding to the credit value range within which the credit value of the IP address is; and calculating an evaluation indicator corresponding to the IP address subset based on the first status and the second status of each of the IP addresses in the IP address subset.

* * * * *